(12) United States Patent
Park et al.

(10) Patent No.: US 10,152,943 B2
(45) Date of Patent: Dec. 11, 2018

(54) DISPLAY DEVICE

(71) Applicant: SAMSUNG DISPLAY CO., LTD., Yongin, Gyeonggi-Do (KR)

(72) Inventors: Na Ri Park, Incheon (KR); Sung Un Park, Suwon-si (KR); Ju Bong An, Asan-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 127 days.

(21) Appl. No.: 14/812,001

(22) Filed: Jul. 29, 2015

(65) Prior Publication Data

US 2016/0203787 A1  Jul. 14, 2016

(30) Foreign Application Priority Data

Jan. 8, 2015  (KR) .................. 10-2015-0002810

(51) Int. Cl.
  *G09G 5/00*  (2006.01)
  *G06F 3/041*  (2006.01)
  *G02F 1/1345*  (2006.01)

(52) U.S. Cl.
  CPC ........... *G09G 5/00* (2013.01); *G02F 1/13454* (2013.01); *G06F 3/0416* (2013.01); *G02F 1/13452* (2013.01); *G09G 2300/0426* (2013.01); *G09G 2300/0852* (2013.01); *G09G 2310/0289* (2013.01); *G09G 2310/0291* (2013.01)

(58) Field of Classification Search
  CPC ............... G02F 1/13452; G09G 5/00; G09G 2300/0426; G09G 2310/0278; G06F 3/0416
  See application file for complete search history.

(56) References Cited

U.S. PATENT DOCUMENTS

| | | | | |
|---|---|---|---|---|
| 6,424,400 B1* | 7/2002 | Kawasaki | ........... | G02F 1/13452 349/149 |
| 9,791,753 B2* | 10/2017 | Chiang | ..................... | H05K 3/32 |
| 2007/0109485 A1* | 5/2007 | Eguchi | .................. | G02F 1/1309 349/151 |
| 2008/0239228 A1* | 10/2008 | Lee | ...................... | G02F 1/13452 349/151 |
| 2011/0169022 A1 | 7/2011 | Shiota et al. | | |
| 2011/0169792 A1* | 7/2011 | Shimizu | ................ | G02F 1/1309 345/204 |

(Continued)

FOREIGN PATENT DOCUMENTS

| | | |
|---|---|---|
| EP | 1 079 357 A1 | 2/2001 |
| KR | 10-2009-0046300 A | 5/2009 |

(Continued)

OTHER PUBLICATIONS

European Search Report dated Jul. 5, 2016 in Corresponding European Patent Application No. 15197080.3.

*Primary Examiner* — Amr Awad
*Assistant Examiner* — Stephen Bray
(74) *Attorney, Agent, or Firm* — Lee & Morse P.C.

(57) ABSTRACT

A display device, including a panel including an active area and a non-active area, the non-active area surrounding the active area; a recess in the non-active area of the panel; a driving circuit unit above the recess; a driving auxiliary part (DAP) in the recess on the panel; and a printed circuit board (PCB) on one side of the panel, the PCB being connected to the driving circuit unit and the DAP.

21 Claims, 8 Drawing Sheets

(56) References Cited

U.S. PATENT DOCUMENTS

| | | | | |
|---|---|---|---|---|
| 2013/0342779 | A1* | 12/2013 | Jung | G02B 6/0083 |
| | | | | 349/43 |
| 2014/0009400 | A1* | 1/2014 | Poorter | G06F 3/041 |
| | | | | 345/173 |
| 2014/0029230 | A1* | 1/2014 | Oh | H05K 1/14 |
| | | | | 361/803 |
| 2014/0183465 | A1* | 7/2014 | Jeong | H01L 51/5237 |
| | | | | 257/40 |
| 2014/0313439 | A1* | 10/2014 | Matsumoto | G06F 3/0412 |
| | | | | 349/12 |
| 2015/0160500 | A1* | 6/2015 | Ikuta | G02F 1/13452 |
| | | | | 349/150 |

FOREIGN PATENT DOCUMENTS

| | | |
|---|---|---|
| KR | 10-2010-0055709 A | 5/2010 |
| KR | 10-2012-0050289 A | 5/2012 |

\* cited by examiner

DISPLAY DEVICE

CROSS-REFERENCE TO RELATED APPLICATION

Korean Patent Application No. 10-2015-0002810, filed on Jan. 8, 2015, in the Korean Intellectual Property Office, and entitled: "Display Device," is incorporated by reference herein in its entirety.

BACKGROUND

1. Field

Embodiments relate to a display device.

2. Description of the Related Art

Various flat panel display devices may address the shortcomings of cathode ray tubes (CRTs) such as, e.g., heavy weight and large volume. Examples of flat panel display devices include liquid crystal display (LCD) devices, field emission display (FED) devices, plasma display panel (PDP) devices, and organic light-emitting display devices.

SUMMARY

Embodiments may be realized by providing a display device, including a panel including an active area and a non-active area, the non-active area surrounding the active area; a recess in the non-active area of the panel; a driving circuit unit above the recess; a driving auxiliary part (DAP) in the recess on the panel; and a printed circuit board (PCB) on one side of the panel, the PCB being connected to the driving circuit unit and the DAP.

The recess may be a trench recessed from a surface of the panel diagonally with respect to a vertical direction to a plane of the panel.

An area on the panel where the recess is formed may completely overlap an area on the panel where the driving circuit unit is disposed.

The DAP may include one or more of a capacitor, a resistor, or an inductor connected to the driving circuit unit.

The DAP may be a multi-layer ceramic capacitor (MLCC).

The display device may further include a conductive layer on the panel; a first anisotropic conductive film between the PCB and the conductive layer; and a second anisotropic conductive film between the conductive layer and the driving circuit unit.

The conductive layer may include a plurality of input conductive patterns, the plurality of input conductive patterns being connected to the PCB via the first anisotropic conductive film and being connected to the driving circuit unit via the second anisotropic conductive film, and a plurality of output conductive patterns, the plurality of output conductive patterns being connected to the driving circuit unit via the second anisotropic conductive film and extending to the active area of the panel.

The plurality of input conductive patterns may include a plurality of connecting pads, respectively, the plurality of connecting pads being connected to a plurality of conductor patterns on the PCB via the first anisotropic conductive film, a plurality of input pads, the plurality of input pads being connected to a plurality of input bumps of the driving circuit unit via the second anisotropic conductive film, and a plurality of connecting lines, respectively, the plurality of connecting lines connecting the plurality of connecting pads and the plurality of input pads.

At least one of the input conductive patterns may further include an extended conductor pattern, the extended conductor pattern extending from the corresponding input pad into the recess and being connected to a first end of the DAP, and a second end of the DAP being connected to the driving circuit unit.

The display device may further include an insulating layer on the conductive layer between the first and second anisotropic conductive films.

The PCB may be a flexible PCB (FPCB).

The panel may be a liquid crystal display (LCD) panel including a plurality of pixels, the plurality of pixels selectively transmitting light incident upon the panel therethrough, a liquid crystal layer, and a color filter layer; or the panel may be an organic electroluminescent (EL) display panel including a plurality of pixels and a self-emitting organic light-emitting layer.

The panel may be a touch screen panel or a liquid crystal lens panel.

Embodiments may be realized by providing a display device, including a panel including an active area and a non-active area, the non-active area surrounding the active area; a recess in the non-active area of the panel; a driving circuit unit inside the recess; a DAP on the panel within the recess; and a PCB on one side of the panel, the PCB being connected to the driving circuit unit and the DAP.

The recess may be a trench recessed from a surface of the panel diagonally with respect to a vertical direction to a plane of the panel.

The display device may further include a conductive layer on the panel; a first anisotropic conductive film between the PCB and the conductive layer; and a second anisotropic conductive film between the conductive layer and the driving circuit unit.

The conductive layer may include a plurality of input conductive patterns, the input conductive patterns being connected to the PCB via the first anisotropic conductive film and being connected to the driving circuit unit via the second anisotropic conductive film, and a plurality of output conductive patterns, the output conductive patterns being connected to the driving circuit unit via the second anisotropic conductive film and extending to the active area of the panel.

The plurality of input conductive patterns may include a plurality of connecting pads, respectively, the plurality of connecting pads being connected to a plurality of conductor patterns on the PCB via the first anisotropic conductive film, a plurality of input pads, the plurality of input pads being connected to a plurality of input bumps of the driving circuit unit via the second anisotropic conductive film, and a plurality of connecting lines, respectively, the plurality of connecting lines connecting the plurality of connecting pads and the plurality of input pads.

At least one of the input conductive patterns may further include an extended conductor pattern, the extended conductor pattern extending from the corresponding input pad into the recess and being connected to a first end of the DAP, and a second end of the DAP being connected to the driving circuit unit.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
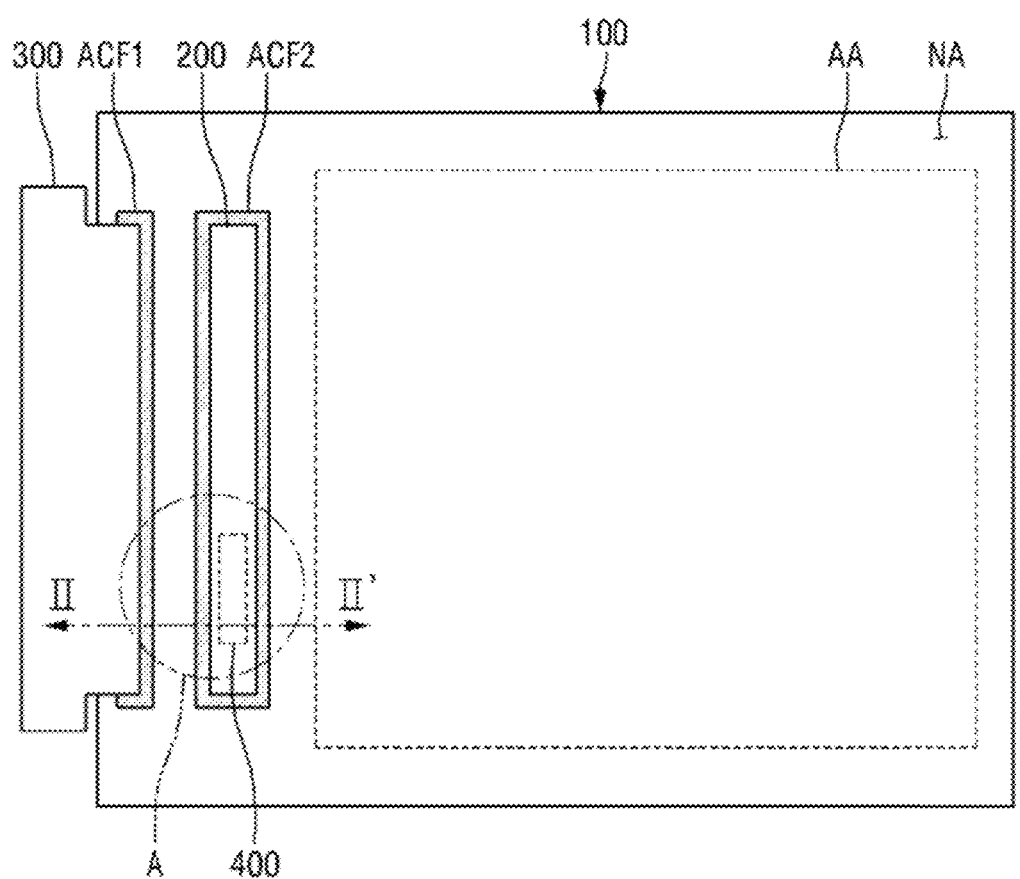
FIG. 1 illustrates a plan view of a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The same reference numbers indicate the same components throughout the specification. In the attached figures, the thickness of layers and regions may be exaggerated for clarity.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

It will be understood that, although the terms first, second, etc., may be used herein to describe various elements, these elements should not be limited by these terms. These terms are only used to distinguish one element from another element. Thus, for example, a first element, a first component or a first section discussed below could be termed a second element, a second component or a second section.

The use of the terms "a" and "an" and "the" and similar referents (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of skill in the art. It is noted that the use of any and all examples, or exemplary terms provided herein is intended merely to better illuminate embodiments and is not a limitation on the scope of embodiments unless otherwise specified. Further, unless defined otherwise, all terms defined in generally used dictionaries may not be overly interpreted.

Exemplary embodiments will hereinafter be described with reference to the accompanying drawings.

FIG. 1 illustrates a plan view of a display device according to an exemplary embodiment. Referring to FIG. 1, the display device may include a panel 100, a driving circuit unit 200, and a printed circuit board 300.

The panel 100 may include an active area AA and a non-active area NA, which surrounds the active area AA. The active area AA may correspond to a display area where an image may be displayed. The non-active area NA may surround the active area AA and may correspond to a non-display area where no image may be displayed.

The panel 100 may be a liquid crystal display (LCD) panel including a plurality of pixels, which selectively transmit therethrough light provided by a backlight unit (not illustrated), a liquid crystal layer, and a color filter layer, or may be an organic electroluminescent (EL) display panel including a plurality of pixels and a self-emitting organic light-emitting layer. In an embodiment, the panel 100 may be an auxiliary panel on a display panel and may be, for example, a touch screen panel or a liquid crystal lens panel. In an embodiment, the panel 100 may be of a type other than those set forth herein, and may receive an electric signal from an external source to perform its inherent functions.

The driving circuit unit 200 may be disposed in the non-active area NA. The driving circuit unit 200 may include one or more chips, which form an integrated circuit (IC), and a plurality of bumps, which may connect the chips to a plurality of conductive patterns. In the exemplary embodiment of FIG. 1, the driving circuit unit 200 may be implemented as an IC. The driving circuit unit 200 may be directly formed in the non-active area NA or the non-display area of the panel 100, or may be formed together with, for example, a plurality of pixel circuits, which may be formed in the active area AA.

The panel 100 may include a recess 400, which may be formed in the non-active area NA.

The recess 400 may be formed in the shape of a trench recessed from the surface of the panel 100 diagonally with respect to a vertical direction to the plane of the panel 100. Driving auxiliary parts (DAP), which assist the driving circuit unit 200, may be mounted in the recess 400.

For example, an area on the panel 100 where the recess 400 is formed may completely overlap an area on the panel 100 where the driving circuit unit 200 is provided. In an embodiment, the area where the recess 400 is formed may partially overlap the area where the driving circuit unit 200 is provided. The recess 400 may be completely covered by the driving circuit unit 200.

The PCB 300 may be disposed on one side of the non-active area NA of the panel 100 near the driving circuit unit 200. The PCB 300 may provide driving power and ground power supplied by an external source (not illustrated) to the panel 100 and may also provide a driving signal, for example, an image signal, to the panel 100. The PCB 300 may be a flexible PCB (FPCB), which has a plurality of metal conductor patterns 320 formed thereon and is flexible enough to be bent.

A first anisotropic conductive film ACF1 may be disposed between the PCB 300 and the panel 100, and a second anisotropic conductive film ACF2 may be disposed between the driving circuit unit 200 and the panel 100. The first anisotropic conductive film ACF1 may provide an electric connection between the PCB 300 and the panel 100, and the second anisotropic conductive film ACF2 may provide an electric connection between the panel 100 and the driving circuit unit 200.

Figure 2:
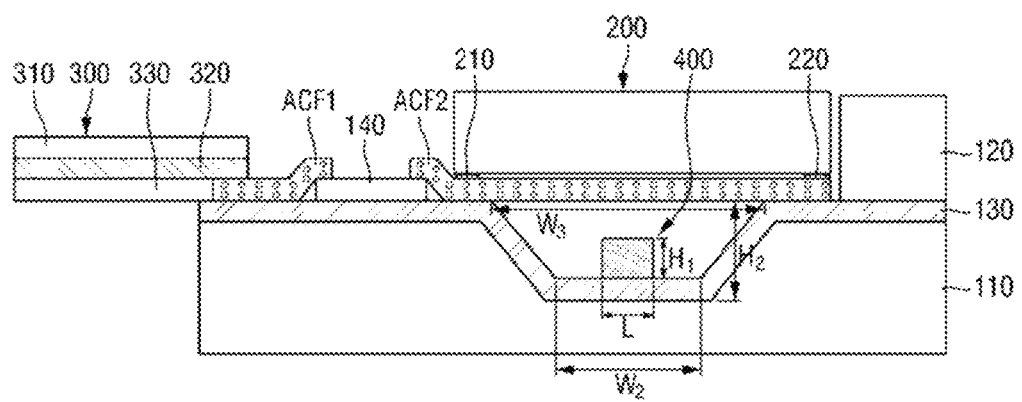
FIG. 2 illustrates a cross-sectional view of a panel shown in FIG. 1, taken along line II-II' of FIG. 1.
Figure 3:
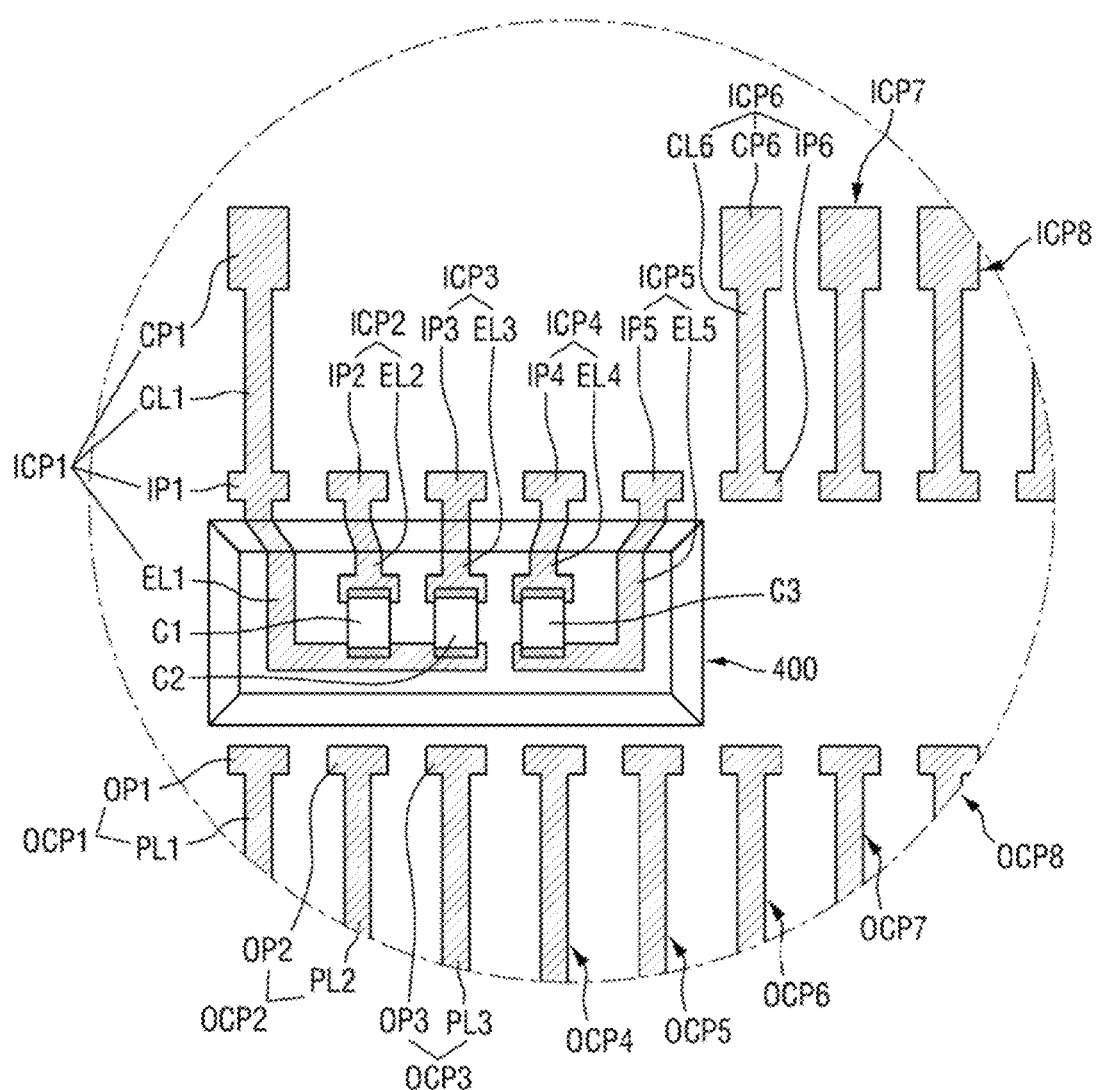
FIG. 3 illustrates a top view of a recess and a plurality of conductive patterns in area A of FIG. 1.

An example of the electric connections among the PCB 300, the panel 100, the DAPs in the recess 400 and the driving circuit unit 200 will hereinafter be described with reference to FIGS. 2 and 3. In the example of FIGS. 2 and 3, the panel 100 may be, for example, an organic EL display panel.

FIG. 2 illustrates a cross-sectional view of the panel 100, taken along line II-II' of FIG. 1. FIG. 3 illustrates a top view of the recess 400 and a plurality of conductive patterns in area A of FIG. 1.

Referring to FIGS. 2 and 3, the panel 100 may be an organic EL display panel, and may include a base substrate 110, a conductive layer 130, which may be formed on the base substrate 110, a sealing board 120, which may be formed on the conductive layer 130, and an insulating layer 140.

For convenience, the base substrate 110 is illustrated in FIG. 2 as being a single-layer substrate. In an embodiment, the base substrate 110 may be a multilayer substrate consisting of a stack of multiple layers that form the panel 100, such as an organic EL display panel or an LCD panel.

For example, in response to the panel 100 being an organic EL display panel, the base substrate 110 may have a stack structure including an insulating substrate formed of, for example, glass, quartz, or ceramic plastics, an amorphous or polycrystalline silicon layer deposited on the insulating substrate, and a plurality of organic light-emitting pixels formed on the amorphous or polycrystalline silicon layer.

At least part of the base substrate 110 may be recessed diagonally with respect to a vertical direction to the plane of the base substrate 110, and the recess 400 may be formed in a peripheral area of the panel 100. The DAPs, which assist the driving circuit unit 200, may be mounted in the recess 400.

The DAPs may be capacitors providing high capacitance to the driving circuit unit 200. For example, the DAPs may be multi-layer ceramic capacitors (MLCCs).

The driving circuit unit 200 may receive the driving power, the ground power and one or more driving signals from an external source (not illustrated) via the PCB 300. The driving circuit unit 200 may process the driving signals and may provide the processed driving signals to the active area AA of the panel 100. For example, the panel 100 may be an organic EL display panel, and the driving signals may include an image signal and a control signal. The driving circuit unit 200 may receive an image signal and a control signal from the external source via the PCB 300, and may provide a data voltage signal and a gate switching signal to a plurality of pixels (not illustrated) on the panel 100 by processing the image signal and the control signal.

The driving circuit unit 200, which may be implemented as an IC, may require, for example, high capacitance, high resistance and high inductance, to adequately perform its circuit functions. The driving circuit unit 200, which may be provided in an organic EL display panel, may require a high-capacitance capacitor for stabilizing power, which may serve as a buffer for supplying stable power, a nose removal capacitor for removing a high-frequency noise signal, and a boosting capacitor, which may be used in a boost converter for increasing the level of a direct current (DC) voltage. It may be difficult to realize such high-capacitance capacitors in the driving circuit unit 200, for example, due to the physical properties of the driving circuit unit 200 as an IC.

The driving circuit unit 200 may be connected to the DAPs, for example, MLCCs, and may be supplied with high capacitance.

As an relatively easy way to connect the DAPs to the driving circuit unit 200, the DAPs may be disposed on the PCB 300. For example, the DAPs may be disposed on the PCB 300, and may then be connected to the driving circuit unit 200 along with other driving signals via the conductive layer 130.

The PCB 300 may become undesirably thick, and may become a limiting factor in the reduction of the thickness of a portable display device, whose thinness may be desirable. In an embodiment, the PCB 300, which may be implemented as an FPCB, may be bent, and the DAPs may be fitted into a receiving unit, such as a hole, on the bracket of a portable display device, in which case, the bracket of the portable display device may be generally weakened and the electromagnetic compatibility (EMC) of the DAPs that are exposed may deteriorate.

In the exemplary embodiment of FIG. 1, the DAPs may be disposed in the recess 400 on the base substrate 110, the thickness of a portable display device may be reduced, and the mechanical strength of the bracket of the portable display device and the EMC characteristics of the DAPs may be improved.

In the exemplary embodiment of FIG. 1, the panel 100, such as an organic EL display panel, may be formed to have a multilayer stack structure, and may be formed to be sufficiently thicker than the DAPs to perform a required display function. No driving parts for performing a display function may be provided in the non-active area NA or the non-display area of the base substrate 110 where the recess 400 is formed, and the presence of the recess 400, which may be formed by etching or cutting part of the base substrate 110 away, may not affect the display function of the panel 100. The DAPs may be mounted in the recess 400 of the base substrate 110, and the DAPs may be surrounded by other layers or elements, such as, for example, the driving circuit unit 200 and the base substrate 110, as illustrated in FIG. 2, and may be shielded from an external electromagnetic field.

No DAPs may be formed on the PCB 300, and the PCB 300 may not require conductive lines or connecting pads for connecting the DAPs and the panel 100, and the size of the PCB 300 may be reduced.

In the example of FIGS. 2 and 3, the DAPs may include a first capacitor C1, a second capacitor C2, and a third capacitor C3. For example, the first, second and third capacitors C1, C2, and C3 may be MLCCs of the same type.

The first, second, and third capacitors C1, C2, and C3 may be mounted in the recess 400, and the driving circuit unit 200 may be disposed over the first, second, and third capacitors C1, C2, and C3 to overlap the first, second, and third capacitors C1, C2, and C3.

For example, a height H1 of the first, second, and third capacitors C1, C2, and C3 may be 0.1 mm to 1 mm, a width W1 of the first, second, and third capacitors C1, C2, and C3 may be 0.1 mm to 1 mm, and a length L of the first, second, and third capacitors C1, C2, and C3 may be 0.2 mm to 2 mm.

For example, the first, second, and third capacitors C1, C2, and C3 may be MLCCs with a height of 0.3 mm, a width of 0.3 mm and a length of 0.6 mm or with a height of 0.5 mm, a width of 0.5 mm and a length of 1 mm.

A height H2 of the recess 400 may be larger than the height H1 of the first, second, and third capacitors C1, C2, and C3. For example, the height H2 of the recess 400 may be 0.5 mm to 3 mm.

The conductive layer 130 may include a plurality of conductive patterns, which are disposed on the base substrate 110.

The plurality of conductive patterns may include a plurality of first through n-th input conductive patterns ICP1 through ICPn, which may be connected to the PCB 300 via the first anisotropic conductive film ACF1 and may be connected to the driving circuit unit 200 via the second anisotropic conductive film ACF2, and a plurality of first through m-th output conductive patterns OCP1 through OCPm, which may be connected to the driving circuit unit 200 via the second anisotropic conductive film ACF2 and extend to the active area AA of the base substrate 110.

The first and sixth through n-th input conductive patterns ICP1 and ICP6 through ICPn may include first and sixth through n-th connecting pads CP1 and CP6 through CPn, respectively, which may be connected to the metal conductor patterns 320 on the PCB 300 via the first anisotropic conductive film ACF1, first and sixth through n-th input pads IP1 and IP6 through IPn, respectively, which may be connected to a plurality of input bumps 210 of the driving circuit unit 200 via the second anisotropic conductive film ACF2, and first and sixth through n-th connecting lines CL1 and CL6 through CLn, respectively, which may connect the connecting pads CP1 and CP6 through CPn and the input pads IP1 and IP6 through IPn.

The first input conductive pattern ICP1 may also include a first extended conductor pattern EL1, which may extend from the first input pad IP1 into the recess 400 and may be connected to first ends of the first and second capacitors C1 and C2.

The second through fourth input conductive patterns ICP2 through ICP4 may include second through fourth input pads IP2 through IP4, respectively, which may be connected to the input bumps 210 of the driving circuit unit 200 via the second anisotropic conductive film ACF2, and second through fourth extended conductor patterns EL2 through EL4, respectively, which may extend from the input pads IP2 through IP4 into the recess 400 and may be connected to second ends of the first through third capacitors C1 through C3.

The fifth input conductive pattern ICP5 may include a fifth input pad IP5, which may be connected to one of the input bumps 210 of the driving circuit unit 200 via the second anisotropic conductive film ACF2, and a fifth extended conductor pattern EL5, which may extend from the fifth input pad IP5 into the recess 400 and may be connected to the first end of the third capacitor C3.

The first ends of the first and second capacitors C1 and C2 may be connected to the first extended conductor pattern EL1 of the first input conductive pattern ICP1, and the second ends of the first and second capacitors C1 and C2 may be respectively connected to the second and third extended conductor patterns EL2 and EL3 of the second and third input conductive patterns ICP2 and ICP3. The connection between the first and second capacitors C1 and C2 and the first through third extended conductive patterns EL1 through EL3 may mean that the first and second capacitors C1 and C2 and the first through third extended conductive patterns EL1 through EL3 may be maintained in physical or electrical contact with each other, and may be achieved by a conductive adhesive.

The first input conductive pattern ICP1 may be connected to the ground power via the first anisotropic conductive film ACF1 and the PCB 300. For example, the first ends of the first and second capacitors C1 and C2 may be connected to the ground power, and the second ends of the first and second capacitors C1 and C2 may be respectively connected to the second and third input pads IP2 and IP3 of the second and third input conductive patterns ICP2 and ICP3 and may also be connected to the input bumps 210 of the driving circuit unit 200 via the second anisotropic conductive film ACF2. At least one of the input bumps 210 of the driving circuit unit 200 may be connected to the first input pad IP1 of the first input conductive pattern ICP1 via the second anisotropic conductive film ACF2, and may supply the ground power to the driving circuit unit 200.

The first and second capacitors C1 and C2 may provide high capacitance to the driving circuit unit 200. For example, the first capacitor C1 may be used as a buffer for supplying stable power, and for example, as a power supply voltage stabilization circuit for the driving circuit unit 200. For example, the second capacitor C2 may be used as a noise removal capacitor for removing a high-frequency noise signal.

The first end of the third capacitor C3 may be connected to the fifth extended conductor pattern EL5 of the fifth input conductive pattern ICP5, and the second end of the third capacitor C3 may be connected to the fourth extended conductor pattern EL4 of the fourth input conductive pattern ICP4. The connection between the third capacitor C3 and the fourth and fifth extended conductive patterns EL4 and EL5 may mean that the third capacitor C3 and the fourth and fifth extended conductive patterns EL4 and EL5 may be maintained in physical or electrical contact with each other, and may be achieved by a conductive adhesive. The first and second ends of the third capacitor C3 may be connected to two of the input bumps 210 of the driving circuit unit 200 via the fourth and fifth input pads IP4 and IP5.

For example, the third capacitor C3 may be used as a boosting capacitor for use in a boost converter for increasing the level of a DC voltage in the driving circuit unit 200.

The driving circuit unit 200 may include the input bumps 210 and a plurality of output bumps 220. The input bumps 210 may be connected to the first through n-th input pads IP1 through IPn of the first through n-th input conductive patterns ICP1 through ICPn via the second anisotropic conductive film ACF2. The output bumps 220 may be connected to first through m-th output pads OP1 through OPm of the first through m-th output conductive patterns OCP1 through OCPm via the second anisotropic conductive film ACF2.

The first through m-th output conductive patterns OCP1 through OCPm may include the first through m-th output pads OP1 through OPm, respectively, and first through m-th driving conductor patterns DL1 through DLm, respectively, which may extend from the first through m-th output pads OP1 through OPm to the active area AA of the base substrate 110. The driving circuit unit 200 may provide a driving voltage and a driving signal to the active area AA via the first through m-th driving conductor patterns DL1 through DLm. In the example of FIGS. 2 and 3, the panel 100 may be an organic EL display panel, and may provide a gate voltage signal, a data voltage signal and a horizontal synchronization signal to the first through m-th driving conductor patterns DL1 through DLm.

The first through n-th input conductive patterns IP1 through IPn except for those connected to the first end of the first or second capacitor C1 or C2 or to the first or second end of the third capacitor C3, i.e., the first and sixth through n-th input conductive patterns IP1 and IP6 through IPn, may be connected to a plurality of printed conductor patterns, respectively, on the PCB 300 via the first and sixth through n-th input pads CP1 and CP6 through CPn and the first anisotropic conductive film ACF1.

The PCB 300 may be an FPCB. For example, the PCB 300 may include a first FPCB 310, a second FPCB 330 and a plurality of printed conductor patterns disposed between the first FPCB 310 and the second FPCB 330.

At least part of the second FPCB 330 may be removed from one end of the PCB 300 so that the printed conductor patterns may be exposed. At least some of the exposed printed conductor patterns may overlap the base substrate 110 at one side of the base substrate 110, and the exposed printed conductor patterns may be respectively connected to the first and sixth through n-th connecting pads CP1 and CP6 through CPn of the input conductive patterns IP1 through IP6 through IPn.

The first anisotropic conductive film ACF1 may be disposed on the PCB 300 and the base substrate 110 in an area where the first and sixth through n-th connecting pads CP1 and CP6 through CPn and the first and sixth through n-th connecting lines CL1 and CL6 through CLn of the first and sixth through n-th input conductive patterns IP1 through IP6 through IPn may be provided, and the second anisotropic conductive film ACF2 may be disposed between the driving circuit unit 200 and the first through n-th input pads IP1 through IPn and the first through n-th input conductive patterns ICP1 through ICPn or the first through m-th output pads OP1 through OPm of the first through m-th output conductive patterns OCP1 through OCPm.

The first and second anisotropic conductive films ACF1 and ACF2 may provide an electrical connection in one direction. In the exemplary embodiment of FIG. 1, the first and second anisotropic conductive films ACF1 and ACF2 may be conductive in a vertical direction to the surface thereof, but may be a non-conductor in a planar direction thereof. The first and second anisotropic conductive films ACF1 and ACF2 may be pressed between the PCB 300 (or the driving circuit unit 200 and the base substrate 110, and may provide physical adhesion and an electric connection to the base substrate 110, the PCB 300 and the driving circuit unit 200.

In the example of FIGS. 2 and 3, the insulating layer 140 may be arranged between the first and second anisotropic conductive films ACF1 and ACF2, and part of the first anisotropic conductive film ACF1 and part of the second anisotropic conductive film ACF2 may be disposed above the insulating layer 140.

The insulating layer 140 may prevent the first through n-th connecting lines CL1 through CLn from being damaged and short-circuited by conductive material spilled out of the first and second anisotropic conductive films ACF1 and ACF2 while the first and second anisotropic conductive films ACF1 and ACF2 is being pressed.

The sealing board 120 may be disposed on the base substrate 110 and the conductive layer 130. The sealing board 120 may be attached onto the base substrate 110 by a sealant, which may be provided among the base substrate 110, the conductive layer, and the encapsulating substrate 120. The sealing board 120 may seal the active area of the panel 100 against an external gas, for example, oxygen.

Figure 4:
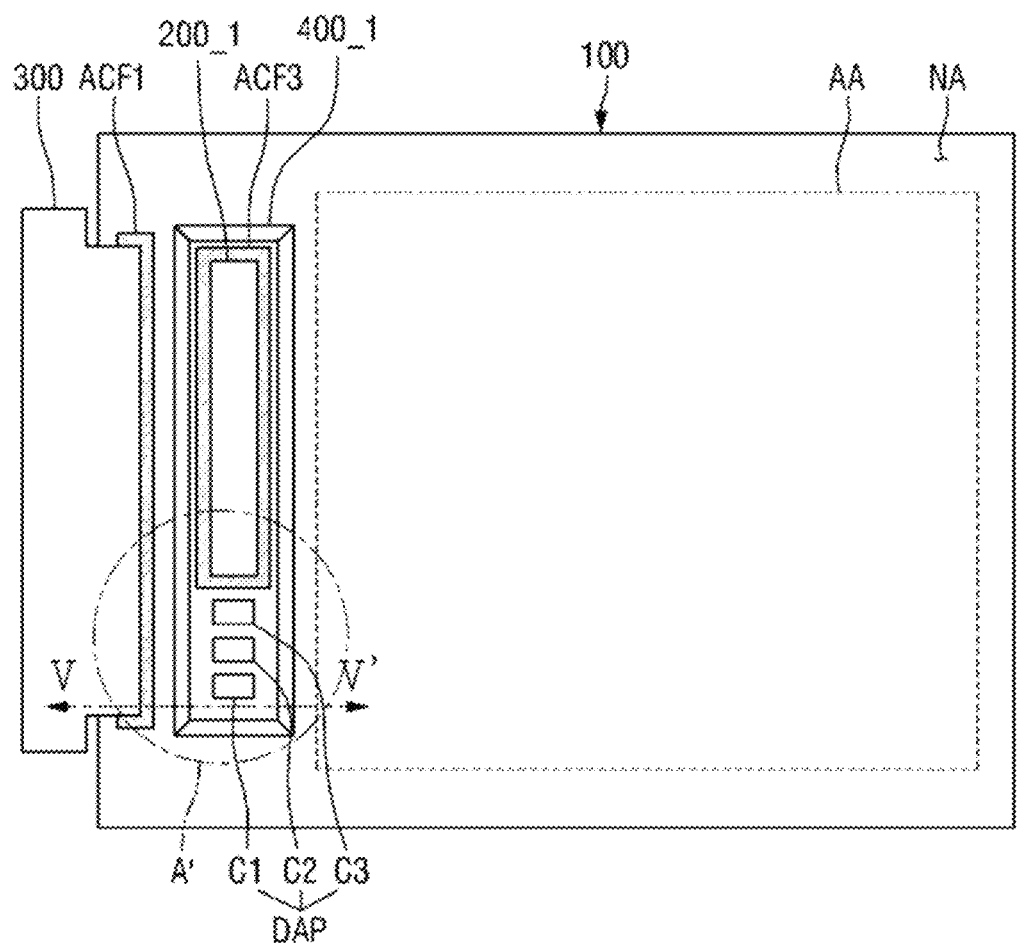
FIG. 4 illustrates a plan view of a display device according to another exemplary embodiment.

FIG. 4 illustrates a plan view of a display device according to another exemplary embodiment.

Figure 5:
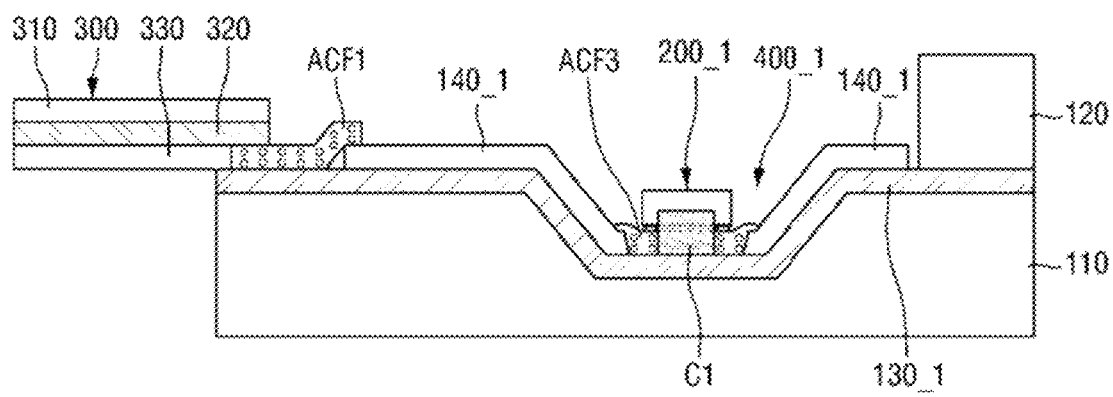
FIG. 5 illustrates a cross-sectional view of a panel shown in FIG. 4, taken along line V-V' of FIG. 4.

FIG. 5 illustrates a cross-sectional view of a panel shown in FIG. 4, taken along line V-V' of FIG. 4

Figure 6:
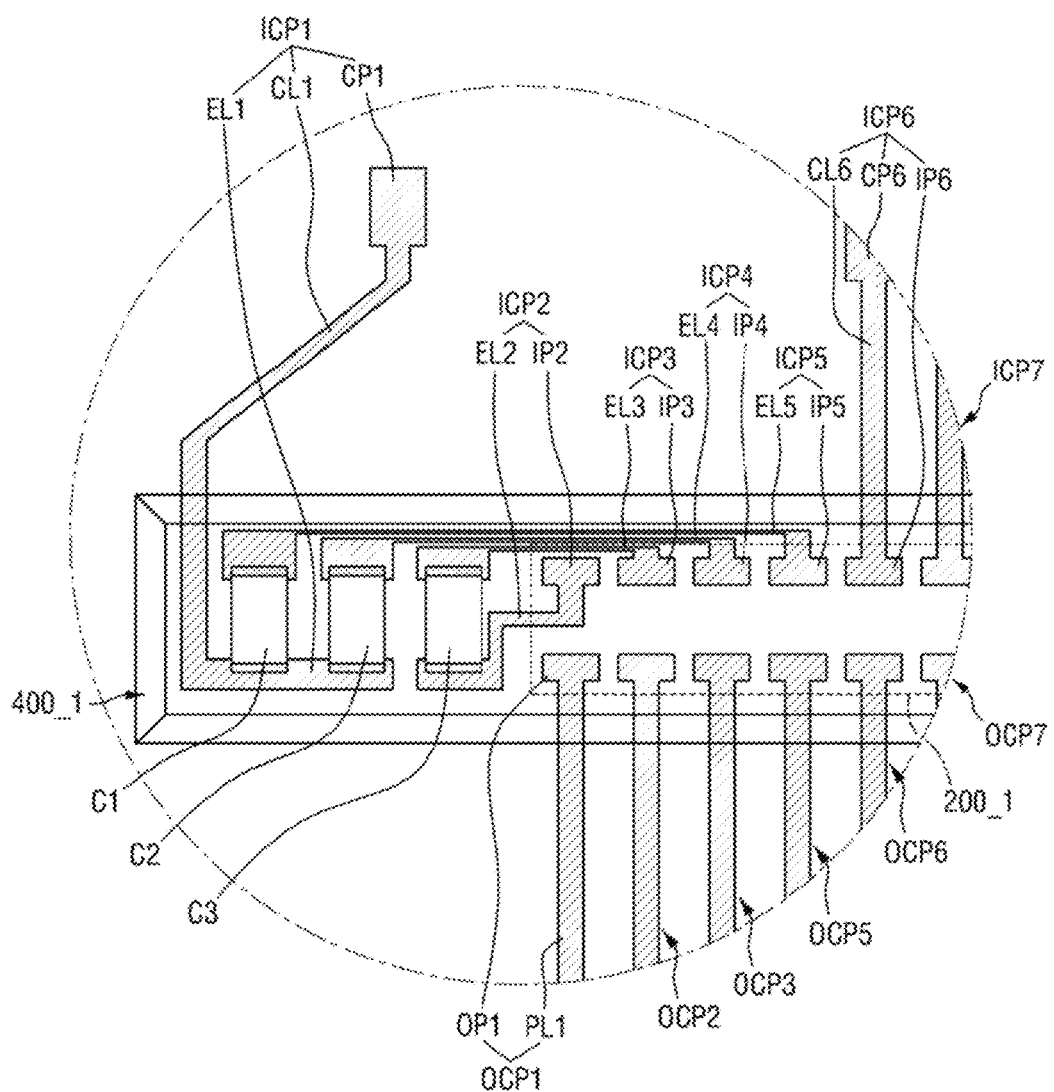
FIG. 6 illustrates a top view of a recess and a plurality of conductive patterns in area A of FIG. 4.

FIG. 6 illustrates a top view of a recess and a plurality of conductive patterns in area A of FIG. 4.

The exemplary embodiment of FIGS. 4 through 6 will hereinafter be described, focusing mainly on differences with the exemplary embodiment of FIGS. 1 through 3. In FIGS. 1 to 6, like reference numerals indicate like elements, and detailed descriptions thereof will be omitted.

Referring to FIGS. 4 to 6, the display device may include a recess 400_1, which may be formed in a non-active area NA of a panel 100, and DAPs and a driving circuit unit 200 may be disposed in the recess 400_1.

An insulating layer 140_1 may extend into the recess 400_1 while surrounding the recess 400_1. The insulating layer 140_1 may prevent a conductive layer 130_1 from being damaged by external pollutants or conductive material spilled out of first and third anisotropic conductive films ACF1 and ACF3 while the first and third anisotropic conductive films ACF1 and ACF3 are being pressed, and may reinforce the physical strength of part of a base substrate 110 where the recess 400_1 is formed.

First and sixth through n-th input conductive patterns ICP1' and ICP6' through ICPn' of the conductive layer 130_1 may extend into the recess 400_1, and second through fifth conductive patterns ICP2' through ICP5' of the conductive layer 130_1 may be formed in the recess 400_1. First through n-th input pads IP1' through IPn' of the first through n-th input conductive patterns ICP1' through ICPn' may be disposed in the recess 400_1, and may be connected to a plurality of input bumps 210 of a driving circuit unit 200_1 via the third anisotropic conductive film ACF3.

First through m-th output conductive patterns OCP1' through OCPm' of the conductive layer 130_1 may extend into the recess 400_1. First through m-th output pads OP1' through OPm' of the first through m-th output conductive patterns OCP1' through OCPm' may be connected, inside the recess 400_1, to a plurality of output bumps 220 of the driving circuit unit 200_1 via the third anisotropic conductive film ACF3.

Figure 7:
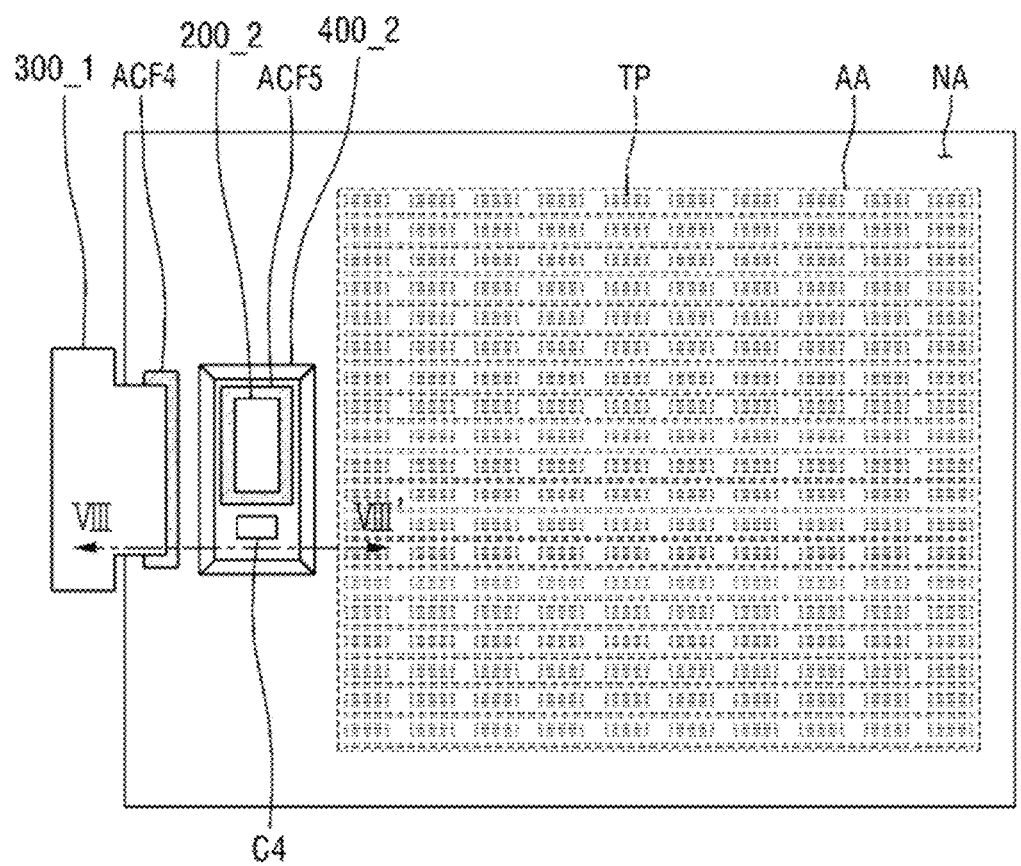
FIG. 7 illustrates a plan view of a display device according to another exemplary embodiment.
Figure 8:
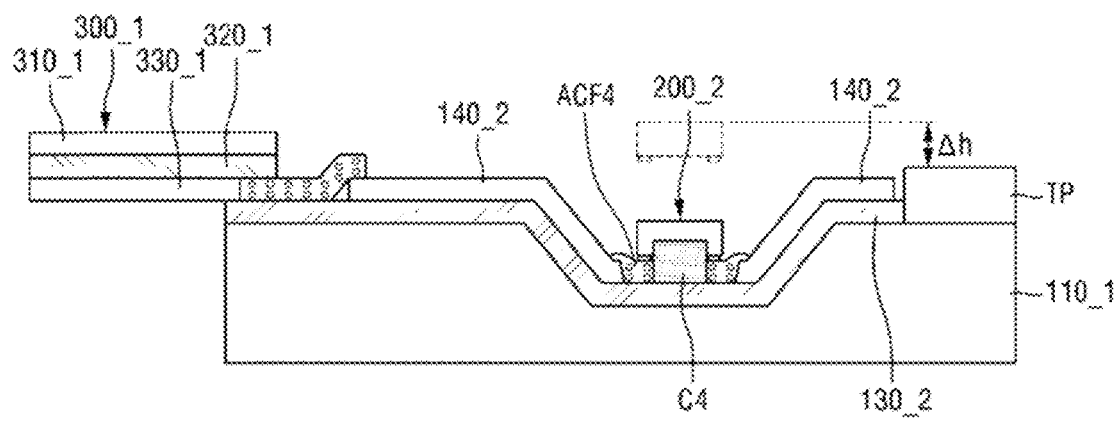
FIG. 8 illustrates a cross-sectional view of a panel shown in FIG. 7, taken along line VII-VII' of FIG. 7.

FIG. 7 illustrates a plan view of a display device according to another exemplary embodiment. FIG. 8 illustrates a cross-sectional view of a panel shown in FIG. 7, taken along line VII-VII' of FIG. 7.

FIGS. 7 and 8 illustrate a display device having a touch screen panel.

The exemplary embodiment of FIGS. 7 and 8 will hereinafter be described, focusing mainly on differences with the exemplary embodiment of FIGS. 1 through 3. In FIGS. 1 to 3, 7 and 8, like reference numerals indicate like elements, and detailed descriptions thereof will be omitted.

Referring to FIGS. 7 and 8, a touch screen panel of the display device may include a plurality of touch patterns TP, which may be formed in an active area AA. DAPs and a driving circuit unit 200_2 may be disposed in a recess 400_2, which may be formed in a non-active area NA of the touch screen panel.

An insulating layer 140_2 may extend into the recess 400_2 while surrounding the recess 400_2. The insulating layer 140_2 may prevent a conductive layer 130 from being damaged by external pollutants, and may reinforce the physical strength of part of a base substrate 110_1 where the recess 4002 is formed.

The base substrate 110_1 may be a window glass of the display device, and may be formed of a transparent glass material. The touch patterns TP may include a transparent conductive material deposited on the base substrate 110, for example, indium tin oxide (ITO) or indium zinc oxide (IZO).

Referring to FIG. 8, the driving circuit unit 200_2 may be disposed outside the recess 400_2, as illustrated in FIGS. 1 to 3, and a height difference may be generated between the top surface of the driving circuit unit 200_2 and the touch patterns TP, and may result in an increase in the thickness of the touch screen panel as the touch patterns TP, which may be formed of a transparent conductive material, may be thinner than the sealing board 120 in the exemplary embodiment of FIGS. 1 to 3.

In the exemplary embodiment of FIGS. 7 and 8, the driving circuit unit 200_2 may be disposed inside the recess 400_2, and an increase in the thickness of the touch screen panel, caused by a height difference between the top surface of the driving circuit unit 200_2 and the touch patterns TP, as illustrated in FIG. 8, may be avoided.

By way of summation and review, in accordance with increased use of smart phones, the demand for portable display devices or portable display panels with reduced thickness and improved mechanical strength has steadily grown.

As part of efforts to reduce the thickness of portable display devices, methods may reduce the volume, per function, of driving parts in consideration that display devices may need driving parts such as high-capacitance capacitors. However, the volume of such driving parts may still serve as a limiting factor to the reduction of the thickness of a portable display device. In various efforts for reducing the thickness of a display device, driving parts may be exposed, and the influence of electromagnetic waves on the driving parts may undesirably increase.

Exemplary embodiments may provide a display device with a reduced thickness and improved mechanical strength. Exemplary embodiments may also provide a display device having driving parts with excellent electromagnetic compatibility (EMC).

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
   a substrate including a recess, the recess being a trench recessed from a surface of the substrate with respect to a vertical direction to a plane of the substrate;
   a display layer on the surface of the substrate;
   a driving circuit unit above the recess;
   a driving auxiliary part (DAP) inside the recess of the substrate; and
   a printed circuit board (PCB) on one side of the substrate, the PCB being connected to the driving circuit unit and the DAP, wherein
   the substrate includes an active area and a non-active area, the non-active area surrounding the active area, wherein
   the recess is in the non-active area of the substrate, and wherein:
   a width of the recess is greater than or equal to a width of the DAP.

2. The display device as claimed in claim 1, wherein the recess is a trench recessed from the surface of the substrate diagonally with respect to a vertical direction to a plane of the substrate.

3. The display device as claimed in claim 1, wherein an area on the substrate where the recess is formed completely overlaps an area on the substrate where the driving circuit unit is disposed.

4. The display device as claimed in claim 1, wherein the DAP includes one or more of a capacitor, a resistor, or an inductor connected to the driving circuit unit.

5. The display device as claimed in claim 1, wherein the DAP is a multi-layer ceramic capacitor (MLCC).

6. The display device as claimed in claim 1, further comprising:
   a conductive layer between a bottom surface of the PCB and the surface of the substrate, the conductive layer extending to DAP inside the recess of the substrate;
   a first anisotropic conductive film between the PCB and the conductive layer; and
   a second anisotropic conductive film between the conductive layer and the driving circuit unit.

7. The display device as claimed in claim 6, wherein the conductive layer includes a plurality of input conductive patterns, the plurality of input conductive patterns being connected to the PCB via the first anisotropic conductive film and being connected to the driving circuit unit via the second anisotropic conductive film, and a plurality of output conductive patterns, the plurality of output conductive patterns being connected to the driving circuit unit via the second anisotropic conductive film and extending to the active area of the substrate.

8. The display device as claimed in claim 7, wherein the plurality of input conductive patterns include a plurality of connecting pads, respectively, the plurality of connecting pads being connected to a plurality of conductor patterns on the PCB via the first anisotropic conductive film, a plurality of input pads, the plurality of input pads being connected to a plurality of input bumps of the driving circuit unit via the second anisotropic conductive film, and a plurality of connecting lines, respectively, the plurality of connecting lines connecting the plurality of connecting pads and the plurality of input pads.

9. The display device as claimed in claim 8, wherein at least one of the input conductive patterns further includes an extended conductor pattern, the extended conductor pattern extending from a corresponding input pad into the recess and being connected to a first end of the DAP, and a second end of the DAP being connected to the driving circuit unit.

10. The display device as claimed in claim 6, further comprising:
    an insulating layer on the conductive layer between the first and second anisotropic conductive films.

11. The display device as claimed in claim 1, wherein the PCB is a flexible PCB (FPCB).

12. The display device as claimed in claim 1, wherein:
    the substrate is a liquid crystal display (LCD) panel including a plurality of pixels, the plurality of pixels selectively transmitting light incident upon the substrate therethrough, a liquid crystal layer, and a color filter layer; or
    the substrate is an organic electroluminescent (EL) display panel including a plurality of pixels and a self-emitting organic light-emitting layer.

13. The display device as claimed in claim 1, wherein the substrate is a touch screen panel or a liquid crystal lens panel.

14. A display device, comprising:
a substrate including a recess, the recess being a trench recessed from a surface of the substrate with respect to a vertical direction to a plane of the substrate;
a display layer on the surface of the substrate;
a driving circuit unit inside the recess;
a driving auxiliary part (DAP) on a lower surface of the recess of the substrate; and
a printed circuit board (PCB) on one side of the substrate, the PCB being connected to the driving circuit unit and the DAP, wherein
the substrate includes an active area and a non-active area, the non-active area surrounding the active area, and wherein
the recess is in the non-active area of the substrate, and wherein:
a width of the recess is greater than or equal to a width of the DAP.

15. The display device as claimed in claim 14, wherein the recess is a trench recessed from the surface of the substrate diagonally with respect to a vertical direction to a plane of the substrate.

16. The display device as claimed in claim 14, further comprising:
a conductive layer between a bottom surface of the PCB and the surface of the substrate, the conductive layer extending to DAP inside the recess of the substrate;
a first anisotropic conductive film between the PCB and the conductive layer; and
a second anisotropic conductive film between the conductive layer and the driving circuit unit.

17. The display device as claimed in claim 16, wherein the conductive layer includes a plurality of input conductive patterns, the input conductive patterns being connected to the PCB via the first anisotropic conductive film and being connected to the driving circuit unit via the second anisotropic conductive film, and a plurality of output conductive patterns, the output conductive patterns being connected to the driving circuit unit via the second anisotropic conductive film and extending to the active area of the substrate.

18. The display device as claimed in claim 17, wherein the plurality of input conductive patterns include a plurality of connecting pads, respectively, the plurality of connecting pads being connected to a plurality of conductor patterns on the PCB via the first anisotropic conductive film, a plurality of input pads, the plurality of input pads being connected to a plurality of input bumps of the driving circuit unit via the second anisotropic conductive film, and a plurality of connecting lines, respectively, the plurality of connecting lines connecting the plurality of connecting pads and the plurality of input pads.

19. The display device as claimed in claim 18, wherein at least one of the input conductive patterns further includes an extended conductor pattern, the extended conductor pattern extending from a corresponding input pad into the recess and being connected to a first end of the DAP, and a second end of the DAP being connected to the driving circuit unit.

20. A display device, comprising:
a panel including an active area and a non-active area, the non-active area surrounding the active area;
a recess in the non-active area of the panel;
a driving circuit unit above the recess;
a driving auxiliary part (DAP) in the recess on the panel;
a printed circuit board (PCB) on one side of the panel;
a conductive layer on the panel;
a first anisotropic conductive film between the PCB and the conductive layer; and
a second anisotropic conductive film between the conductive layer and the driving circuit unit,
the PCB being connected to the driving circuit unit and the DAP,
wherein the conductive layer includes a plurality of input conductive patterns, the plurality of input conductive patterns being connected to the PCB via the first anisotropic conductive film and being connected to the driving circuit unit via the second anisotropic conductive film, and a plurality of output conductive patterns, the plurality of output conductive patterns being connected to the driving circuit unit via the second anisotropic conductive film and extending to the active area of the panel,
wherein the plurality of input conductive patterns include a plurality of connecting pads, respectively, the plurality of connecting pads being connected to a plurality of conductor patterns on the PCB via the first anisotropic conductive film, a plurality of input pads, the plurality of input pads being connected to a plurality of input bumps of the driving circuit unit via the second anisotropic conductive film, and a plurality of connecting lines, respectively, the plurality of connecting lines connecting the plurality of connecting pads and the plurality of input pads, and
wherein at least one of the input conductive patterns further includes an extended conductor pattern, the extended conductor pattern extending from a corresponding input pad into the recess and being connected to a first end of the DAP, and a second end of the DAP being connected to the driving circuit unit.

21. The display device as claimed in claim 1, wherein a height of the recess is equal to or greater than a height of the DAP inside the recess.

* * * * *